(12) United States Patent
Rozenberg et al.

(10) Patent No.: US 9,781,488 B2
(45) Date of Patent: Oct. 3, 2017

(54) CONTROLLED ADAPTIVE RATE SWITCHING SYSTEM AND METHOD FOR MEDIA STREAMING OVER IP NETWORKS

(71) Applicants: Adi Rozenberg, Shoham (IL); Limor Touriel, Matam (IL)

(72) Inventors: Adi Rozenberg, Shoham (IL); Limor Touriel, Matam (IL)

( * ) Notice: Subject to any disclaimer, the term of this patent is extended or adjusted under 35 U.S.C. 154(b) by 69 days.

(21) Appl. No.: 14/813,337

(22) Filed: Jul. 30, 2015

(65) Prior Publication Data

US 2017/0034545 A1  Feb. 2, 2017

(51) Int. Cl.
| | |
|---|---|
| H04N 7/173 | (2011.01) |
| H04N 21/643 | (2011.01) |
| H04N 21/2343 | (2011.01) |
| H04N 21/238 | (2011.01) |
| H04N 21/24 | (2011.01) |
| H04N 21/6583 | (2011.01) |

(52) U.S. Cl.
CPC . *H04N 21/64322* (2013.01); *H04N 21/23439* (2013.01); *H04N 21/23805* (2013.01); *H04N 21/2402* (2013.01); *H04N 21/6583* (2013.01)

(58) Field of Classification Search
CPC ........... H04N 7/17309; H04N 21/6118; H04N 7/17318; H04N 21/235; H04N 21/435
USPC .............. 725/91–93, 106–116; 709/217–232
See application file for complete search history.

(56) References Cited

U.S. PATENT DOCUMENTS

| | | | | |
|---|---|---|---|---|
| 7,190,681 B1* | 3/2007 | Wu | ...................... | H04L 12/5601 370/316 |
| 7,376,159 B1* | 5/2008 | Stanger | .................. | H04J 3/1682 370/528 |
| 7,583,631 B2* | 9/2009 | Tan | ........................ | H04W 72/10 370/329 |
| 7,634,269 B2* | 12/2009 | Gallagher | ............. | H04W 16/16 370/331 |
| 7,711,839 B2* | 5/2010 | Bordes | .............. | H04L 29/06027 370/230.1 |

(Continued)

OTHER PUBLICATIONS

Gary McGath, "Basics of Streaming Protocols", 2013, http://www.garymcgath.com/streamingprotocols.html.
(Continued)

*Primary Examiner* — Annan Shang
(74) *Attorney, Agent, or Firm* — Haim M. Factor; 1st-Tech-Ideas

(57) ABSTRACT

A system for adaptively streaming video content over an IP network and an encoding device, the system comprising devices and non-transitory computer-readable storage media having executable computer modules, comprising: a sender device interacting with the network, the device configured to send a video stream to the network and to receive a recovery packet stream from the network; a receiving device configured to receive the video stream and to transmit a recovery packet stream back to the sender through the network; and a bandwidth probe configured to be periodically sent with the video stream to the receiving device to determine an instantaneous network bandwidth; wherein the sender device is configured to command the encoding device to adapt the video stream, based upon the instantaneous network bandwidth and the recovery packet stream.

16 Claims, 11 Drawing Sheets

(56) References Cited

U.S. PATENT DOCUMENTS

| | | | | |
|---|---|---|---|---|
| 8,111,698 B2* | 2/2012 | Bosch | H04L 1/1854 | 370/394 |
| 8,276,035 B1* | 9/2012 | Savarese | H04L 1/0007 | 714/749 |
| 8,300,653 B2* | 10/2012 | Smith | H04L 1/1887 | 370/444 |
| 8,752,102 B2* | 6/2014 | Menn | H04L 1/1838 | 725/116 |
| 9,578,360 B2* | 2/2017 | Weidenfeller | H04N 21/6582 | |
| 2002/0047899 A1* | 4/2002 | Son | H04L 12/2801 | 348/114 |
| 2003/0126238 A1* | 7/2003 | Kohno | H04L 1/0009 | 709/220 |
| 2003/0135631 A1* | 7/2003 | Li | H04L 29/06027 | 709/231 |
| 2003/0223466 A1* | 12/2003 | Noronha, Jr. | H04N 21/226 | 370/537 |
| 2004/0098748 A1* | 5/2004 | Bo | H04N 7/17336 | 725/105 |
| 2004/0228273 A1* | 11/2004 | Kurobe | H04L 1/1874 | 370/229 |
| 2004/0261101 A1* | 12/2004 | Iwamura | H04B 3/542 | 725/32 |
| 2005/0101329 A1* | 5/2005 | Gallagher | H04W 16/16 | 455/436 |
| 2006/0259627 A1* | 11/2006 | Kellerer | H04L 29/06 | 709/227 |
| 2008/0123560 A1* | 5/2008 | Nassor | H04L 1/0017 | 370/255 |
| 2008/0170490 A1* | 7/2008 | Connors | H04L 27/2647 | 370/203 |
| 2008/0212471 A1* | 9/2008 | Jowett | H04L 65/80 | 370/231 |
| 2008/0232472 A1* | 9/2008 | Kwon | H03M 13/356 | 375/240.13 |
| 2008/0285566 A1* | 11/2008 | Sammour | H04L 1/188 | 370/394 |
| 2010/0034256 A1* | 2/2010 | Bennett | H04N 7/24 | 375/240.01 |
| 2010/0161824 A1* | 6/2010 | Viger | H04L 12/4633 | 709/231 |
| 2010/0260180 A1* | 10/2010 | Wu | H04L 1/1819 | 370/390 |
| 2010/0260780 A1* | 10/2010 | Levy | A61K 9/5094 | 424/172.1 |
| 2011/0030019 A1* | 2/2011 | Ulm | H04N 7/17318 | 725/98 |
| 2012/0170523 A1* | 7/2012 | Civanlar | H04N 21/631 | 370/329 |
| 2012/0173748 A1* | 7/2012 | Bouazizi | H04L 65/4084 | 709/231 |
| 2012/0214512 A1* | 8/2012 | Siomina | G01S 5/0205 | 455/456.2 |
| 2012/0221678 A1* | 8/2012 | Tanaka | H04L 1/1835 | 709/217 |
| 2013/0013671 A1* | 1/2013 | Relan | H04L 67/34 | 709/203 |
| 2013/0024901 A1* | 1/2013 | Sharif-Ahmadi | G06F 17/30017 | 725/114 |
| 2013/0290557 A1* | 10/2013 | Baratz | H04L 65/60 | 709/231 |
| 2014/0003417 A1* | 1/2014 | Shauh | H04W 56/001 | 370/350 |
| 2014/0098745 A1* | 4/2014 | Balasubramanian | H04W 72/005 | 370/328 |
| 2015/0289138 A1* | 10/2015 | Wang | H04L 63/101 | 455/411 |
| 2015/0341812 A1* | 11/2015 | Dion | H04W 24/08 | 370/252 |
| 2016/0088550 A1* | 3/2016 | Rabii | H04W 48/18 | 370/310 |

OTHER PUBLICATIONS

Alex MacAulay, Boris Felts, Yuval Fisher, "WhitePaper—IP Streaming of MPEG4: Native RTP vs MPEG-2 Transport Stream", 2005, http://pdf.textfiles.com/manuals/STARINMANUALS/Envivio/Manual/White%20Paper%20-%20IP%20Streaming%20of%20MPEG-4%20-%20Native%20RTP%20vs%20MPEG-2%20Transport%20Stream.pdf.

Howdy Peirce, "The Many Ways to Stream Video using RTP and RTSP", 2009, https://cardinalpeak.com/blog/the-many-ways-to-stream-video-using-rtp-and-rtsp/.

* cited by examiner

CONTROLLED ADAPTIVE RATE SWITCHING SYSTEM AND METHOD FOR MEDIA STREAMING OVER IP NETWORKS

RELATED APPLICATION

The present application claims priority from U.S. Provisional Patent Application No. 62/030,630, filed 30 Jul. 2014, whose disclosure is incorporated herein by reference.

FIELD AND BACKGROUND OF THE INVENTION

Embodiments of the current invention are related to media streaming and particularly to a system and method to optimize media streaming over one or more IP networks.

In the specification and claims which follow, the expression "media streaming" or "streaming" is intended to mean the transfer of video information (and any associated audio information, if applicable), as known in the art, typically from one or more servers to a plurality of devices (typically called "receivers") located at a distance from the respective servers. As such, terms such as "video content", "content", and "media stream" (or abbreviated "stream") are used interchangeably in the specification and claims which follow hereinbelow to mean video content which is streamed. Typically, a stream comprises a plurality of "packets", as known in the art and described further hereinbelow.

Other terms used in the specification hereinbelow, which are known in the art, include:
  "Moving Picture Experts Group (MPEG)" is intended to mean a working group of experts, formed by ISO and IEC to set standards for audio and video compression and transmission;
  "MPEG transport stream (TS)" is intended to mean a standard format for transmission and storage of audio, video, and program and system information protocol (PSIP) data. Transport Stream is specified in MPEG-2 Part 1, Systems (formally known as ISO/IEC standard 13818-1 or ITU-T Rec. H.222.0);
  "TS Packet" is intended to mean the basic unit of data in a transport stream. "Program Clock Reference (PCR)" is intended to mean a value transmitted in the adaptation field of an MPEG-2 transport stream packet. PCR, when properly used, is used to generate a system_timing_clock in a decoder to present synchronized content, such as audio tracks matching the associated video, at least once each 100 ms;
  "Presentation timestamp (PTS)" is intended to mean a timestamp metadata field in an MPEG transport stream or MPEG program stream that is used to achieve synchronization of programs separate elementary streams (i.e., video, audio, subtitles). Reference: https://en.wikipedia.org/wiki/Presentation_timestamp#cite_note-teknotes-1
  "Group of Pictures (GOP)" has an intended meaning of a group of pictures, or GOP structure in video coding, (ref https://en.wikipedia.org/wiki/Data_compression#Video) and specifies the order in which intra- and inter-frames are arranged. GOP is a group of successive pictures within a coded video stream. Each coded video stream consists of successive GOPs. Visible frames are generated from the pictures contained in GOP;
  "Packetized Elementary Stream (PES)" is intended to mean a specification in the MPEG-2 Part 1 (Systems) (ISO/IEC 13818-1) and ITU-T H.222.0 that defines carrying elementary streams (usually the output of an audio or video encoder) in packets within MPEG program stream and MPEG TS. The elementary stream is packetized by encapsulating sequential data bytes from the elementary stream inside PES packet headers.
  "Real-time Transport Protocol (RTP)" is intended to mean a standardized packet format for delivering audio and video over IP networks. RTP is used extensively in communication and entertainment systems that involve streaming media, such as telephony, video teleconference applications, television services and web-based push-to-talk features. RTP is used in conjunction with the RTP Control Protocol (RTCP). While RTP carries media streams, RTCP is used to monitor transmission statistics and quality of service (QoS) and aids synchronization of multiple streams. RTP is originated and received on even port numbers and the associated RTCP communication uses the next higher odd port number. RTP was developed by the Audio-Video Transport Working Group of the Internet Engineering Task Force (IETF) and first published in 1996 as RFC 1889, superseded by RFC 3550 in 2003;
  "User Datagram Protocol (UDP)" is intended to mean one of the core members of the Internet Protocol Suite, the set of network protocols used for the Internet. With UDP, computer applications can send messages, in this case referred to as datagrams, to other hosts on an IP network without requiring prior communications to set up special transmission channels or data paths. UDP uses a simple transmission model without implicit handshaking dialogues for providing reliability, ordering, or data integrity. Thus, UDP provides an unreliable service and datagrams may arrive out of order, appear duplicated, or go missing without notice. UDP assumes that error checking and correction is either not necessary or performed in the application, avoiding the overhead of such processing at the network interface level.
  "Forward Error Correction (FEC)" is intended to mean a technique to recover partial or full, packet information based on calculation made on the information. FEC may be effected by means of XOR between packets or another mathematical computation;
  "Pro-MPEG" is intended to mean Professional-MPEG Forum—an association of broadcasters, program makers, equipment manufacturers, and component suppliers with interests in realizing the interoperability of professional television equipment, according to the implementation requirements of broadcasters and other end-users;
  "SMPTE 2022" is intended to mean an FEC standard for video transport, initially developed by Pro-MPEG Forum and added to by the Video Services Forum, and describes both a FEC scheme and a way to transport constant bit rate video over IP networks.

Media streaming over switching IP networks such as fiber, leased line, CDN, public IP, wireless data networks, VSAT, and cellular networks is a challenging technical problem. A media stream may be impacted by a number of network aberrations (ex: packet loss, jitter, disorder, and capacity changes, inter alia) that make it difficult to sustain a constant stream from sender to receiver.

Reference is currently made to FIG. 1, which is a prior art block diagram of a media encoder 15 (also referred to as a "encoder", "media sending device" or a "sender" hereinbelow and in the claims which follow) connected with a media receiver 20 (i.e., mobile devices, smart TVs, inter alia) over an IP network 25 (i.e., public IP, unmanaged networks, fiber networks, MPLS, inter alia). The network and/or media receiver may experience different network impairments and network capacities. For example, a cellular network may be more prone to capacity problems while a wireless network is more prone to packet loss.

There are two main approaches known in the art which address the problem of media streaming over switching IP networks, as described hereinbelow.

1. Well managed networks, have UDP/RTP and redundant protection information in the form of forward error correction (FEC), which is sent with the media stream and consumes 30-50% extra bandwidth in one direction. This solution has a low time delay; however it may not tolerate high packet loss nor network capacity drop-off.
2. For small scale operation, streaming with retransmission protection, also called Automatic Repeat-reQuest (ARQ) may be used. However ARQ is not useful for large-scale operations. ARQ has modest time delays, it may tolerate high packet loss, but it cannot tolerate network capacity drop.

The two main approaches listed above are addressed hereinbelow:

UDP/RTP

Media streaming with UDP/RTP is not suited for mobile or mass distribution application as these larger-scale networks are not considered "managed".

ARQ

Another solution, ARQ, is currently offered by several vendors to address 100% recovery of lost packets. ARQ has been found to offer superior performance at lower overhead compared with existing packet loss recovery solutions.

Prior art ARQ systems work with a sender sending/transmitting UDP/RTP packets in a stream over an unmanaged IP-based packet network to several receivers. Packet loss detected by a receiver is reported to the sender using special RTCP messages. Each message may contain one or more different requests. ARQ packet processing is effective when network capacity is larger than that of the initial media stream bandwidth. As noted previously, the ARQ process allows for packet recovery with retransmission of lost packets. However if the network capacity (i.e. maximum bandwidth available for the network) drops below that of the media stream bandwidth, the ARQ method (i.e. of providing a recovery by retransmitting lost packets) cannot effectively recover lost packets.

Reference is currently made to FIG. 2, which is a prior art flow and block diagram showing an exemplary video stream 50 from a sender 52 to an ARQ receiver 65 and a loss of several packets 55 (indicated as D2, D6, D8, and D9) and subsequent respective request packets 60 (indicated as R2, R6, R8-9.) In general, a receiver requests resending packets several times during a time window in which a packet is in a receiver buffer (not show in figure). In the figure, sender 52 processes the receiver's request packets (R2, R6, R8-9) and sends respective recovery packets 62 (D3, D5, D10) back to the receiver on the main content stream (indicated by the arrows connecting the sender with the receiver).

A major shortcoming of such an ARQ system is that sometimes the IP link (i.e. the bandwidth between the sender and the receiver) may reach its capacity limit due to either a physical connection (ex: ADSL/VDSL) or by a capacity limit provided by the service provider (ex: a mobile network provider). As shown in FIG. 2, ARQ systems can send a burst of recovery packets in response to a burst of packet loss requests. The burst of recovery packets may block or interfere with the stream's packet flow, causing additional lost packets.

Some ARQ systems limit the link by employing traffic shaping, as known in the art. Traffic shaping can act to impact both the stream and the recovery packets by limiting bandwidth, effectively not addressing situations where recovery packets may block the media stream.

Workflow—Prior Art

An input video feed is encoded by an encoder, which is encodes a video stream (also known as a media stream). Encoder output is converted to an IP stream for transport over an IP network. The IP stream may be protected with either a FEC scheme or an ARQ solution. Both FEC and ARQ serve to recover lost packets, with the assumption that network conditions allow sufficient bandwidth for both the IP stream and the recovery data. If available network bandwidth is smaller than the IP stream, the recovery data will not be able to pass to recover the lost media packets, and the IP stream won't be received properly at the receiving side (i.e. media receiver).

There is therefore a need to have a media streaming system that can operate over challenging network impairments, and which can provide the highest media bandwidth and shortest time delay to the receiver.

SUMMARY OF THE INVENTION

According to the teachings of the present invention there is provided a system for adaptively streaming video content over an IP network and an encoding device, the system comprising devices and non-transitory computer-readable storage media having executable computer modules, comprising: a sender device interacting with the network, the device configured to send a video stream to the network and to receive a recovery packet stream from the network; a receiving device configured to receive the video stream and to transmit a recovery packet stream back to the sender through the network; and a bandwidth probe configured to be periodically sent with the video stream to the receiving device to determine an instantaneous network bandwidth; wherein the sender device is configured to command the encoding device to adapt the video stream, based upon the instantaneous network bandwidth and the recovery packet stream.

According to the teachings of the present invention there is further provided a computer-implemented method for adaptive bitrate switching of video content over an IP network comprising the steps of: sending a video stream from a sender device to the network; receiving the video stream from the network by the receiving device and the receiving device transmitting a respective recovery packet stream back to the sender device through the network; periodically sending a bandwidth probe with the video stream to the receiving device to determine an instantaneous network bandwidth; and commanding an encoder to adapt the video stream, based upon instantaneous network bandwidths and the recovery packet stream.

BRIEF DESCRIPTION OF THE DRAWINGS

The invention is herein described, by way of example only, with reference to the accompanying drawings, wherein.

DETAILED DESCRIPTION OF EMBODIMENTS

Figure 1:
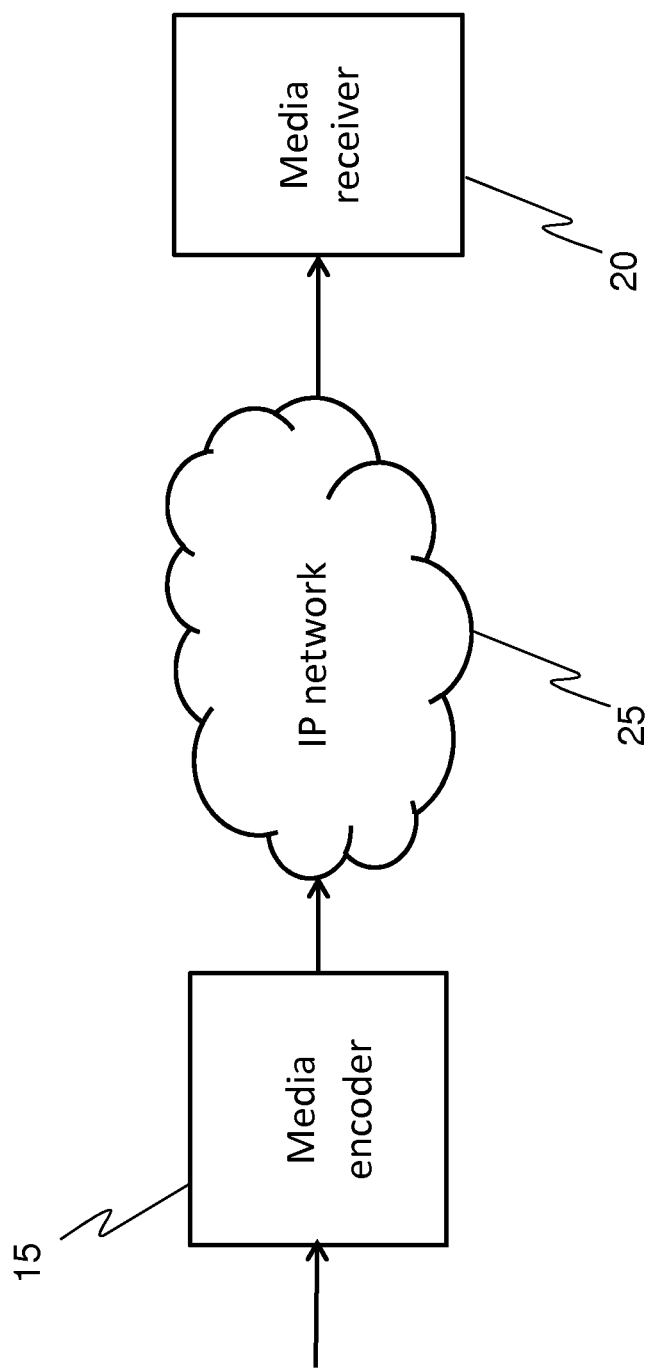
FIG. 1 is a prior art block diagram of a media server connected with a plurality of receiving devices over a plurality of networks.
Figure 2:
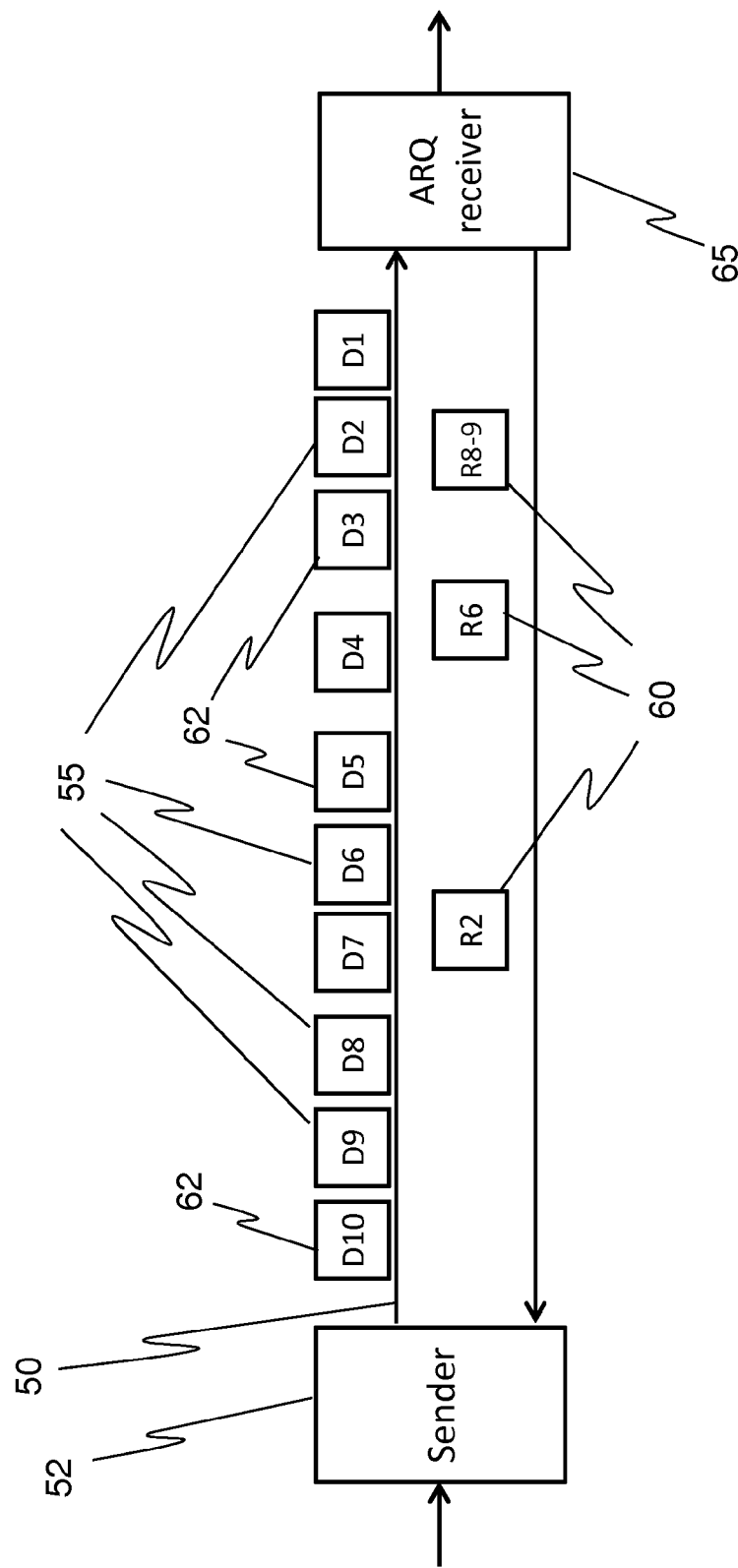
FIG. 2 is a prior art flow and block diagram showing an exemplary stream from a sender an ARQ receiver and a loss of several packets and subsequent respective request packets.

Embodiments of the current invention include a novel solution to distribute media content over a plurality of IP networks and impairments. Embodiments of the current invention address the need for high bitrate delivery while providing low time delay and error correction handling capability. Embodiments of the current invention address limitations of the prior art solutions noted hereinabove.

An embodiment of the current invention uses adaptive bitrate switching and protected ARQ over UDP protocol to adapt stream rate to network condition for each receiver. The solution is based on a combination of addressing both stream impairments and link capacity.

The solution, as described in detail hereinbelow, is based on the following techniques:
  ARQ UDP streaming to recover any packet;
  ARQ recovery packet rate limitation;
  calculation of the stream health based on ARQ request numbers; and
  network probing capability.

The underlying protocol used in embodiments of the current invention is UDP, which is considered unreliable but is faster compared to TCP for streaming applications. To accommodate for UDP unreliable delivery characteristics, embodiments of the current invention employ Real Time Protocol (RTP) and packet recovery with ARQ. This approach yields results as reliable as those using the TCP protocol but with higher bitrate utilization.

Embodiments of the current invention further address another aspect of network behavior, namely capacity/bandwidth changes. An IP network (i.e., public internet, metro internet, home wireless network, and cellular network) may change its capacity from time to time due to network element failure, over subscription, and congestion, inter alia.

Capacity changes express themselves as changes to the available capacity available to respective users at a given time. As noted hereinabove, bandwidth drop/decrease causes packet loss in cases where the media stream is higher than given link/network capacity. One embodiment of the current invention includes detection and reaction to bandwidth change; to recover packet loss during a bandwidth drop and to reduce the stream bitrate, so that the new bit rate will be lower than an initial bandwidth.

Another embodiment of the current invention includes a solution to detect when conditions are favorable to increase stream bit rate. The solution incorporates sophisticated network bandwidth probing along with ARQ to determine a new bit rate to be used. This capability allows utilizing 80-90% of the available network capacity, which is nearly a 50% increase over adaptive streaming and which additionally yields increased picture quality (as increased media bitrate infers higher video quality and resolution).

Embodiments noted hereinabove are discussed in detail in the figures which follow.

The term "protection potential", as used in the specification and claims which follow, is intended to mean a statistic calculated from: the number of packets requested to be corrected, but currently waiting; plus the number of packets requested to be corrected and currently being addressed; plus the maximum correction index (which is a function of a predefined time delay and a rate limit—either hardware and or software limit of bandwidth). One example of the relationship of protection potential versus protection threshold is if the protection potential is higher than a protection threshold, then a lower bitrate that meets a new bandwidth is selected for the next segment transmission.

Another embodiment of the current invention includes network bandwidth probing; employing ARQ protection and protection statistics to determine network capacity—another term intended to have the same meaning as "network bandwidth". As described further hereinbelow, a bandwidth probe and a pre-defined bandwidth step are sent from time to time with the media stream to each receiver. If the packet loss is lower than a defined packet loss threshold, then an algorithm determines a network bandwidth which may allow more data to be sent.

Figure 3:
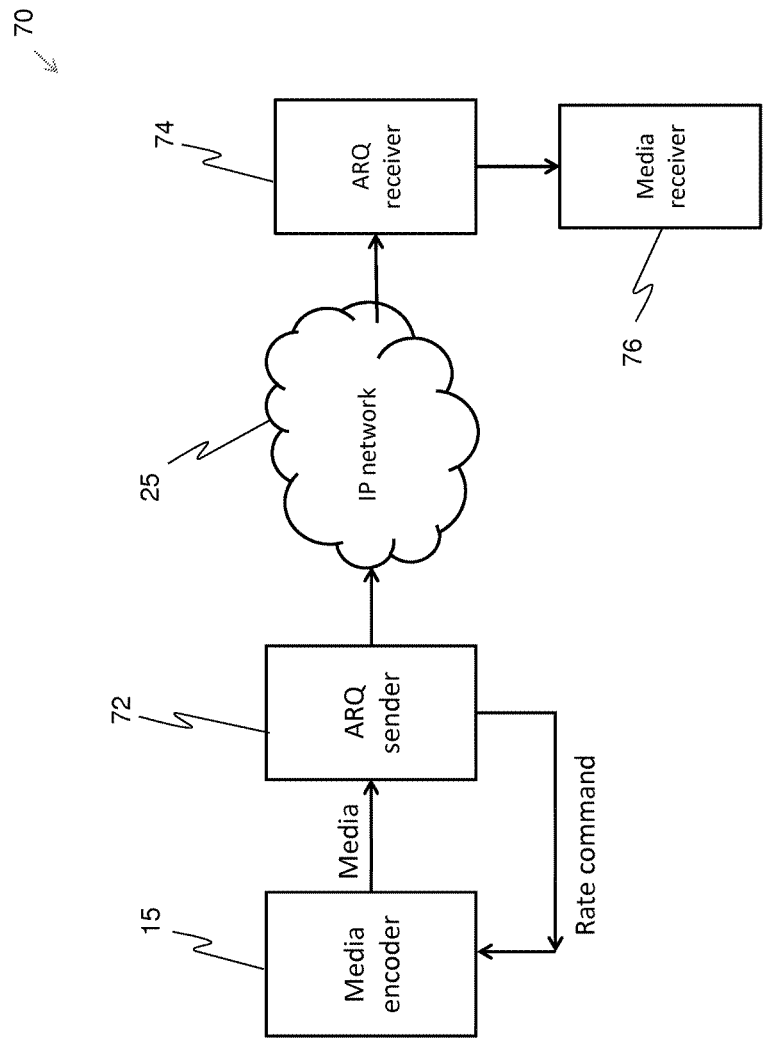
FIGS. 3 and 4 are schematic process block diagrams of a media streaming system 70, including the Media encoder and IP network of FIG. 1 and of an ARQ sender and its interaction with the Media encoder, respectively, in accordance with an embodiment of the current invention.
Figure 4:
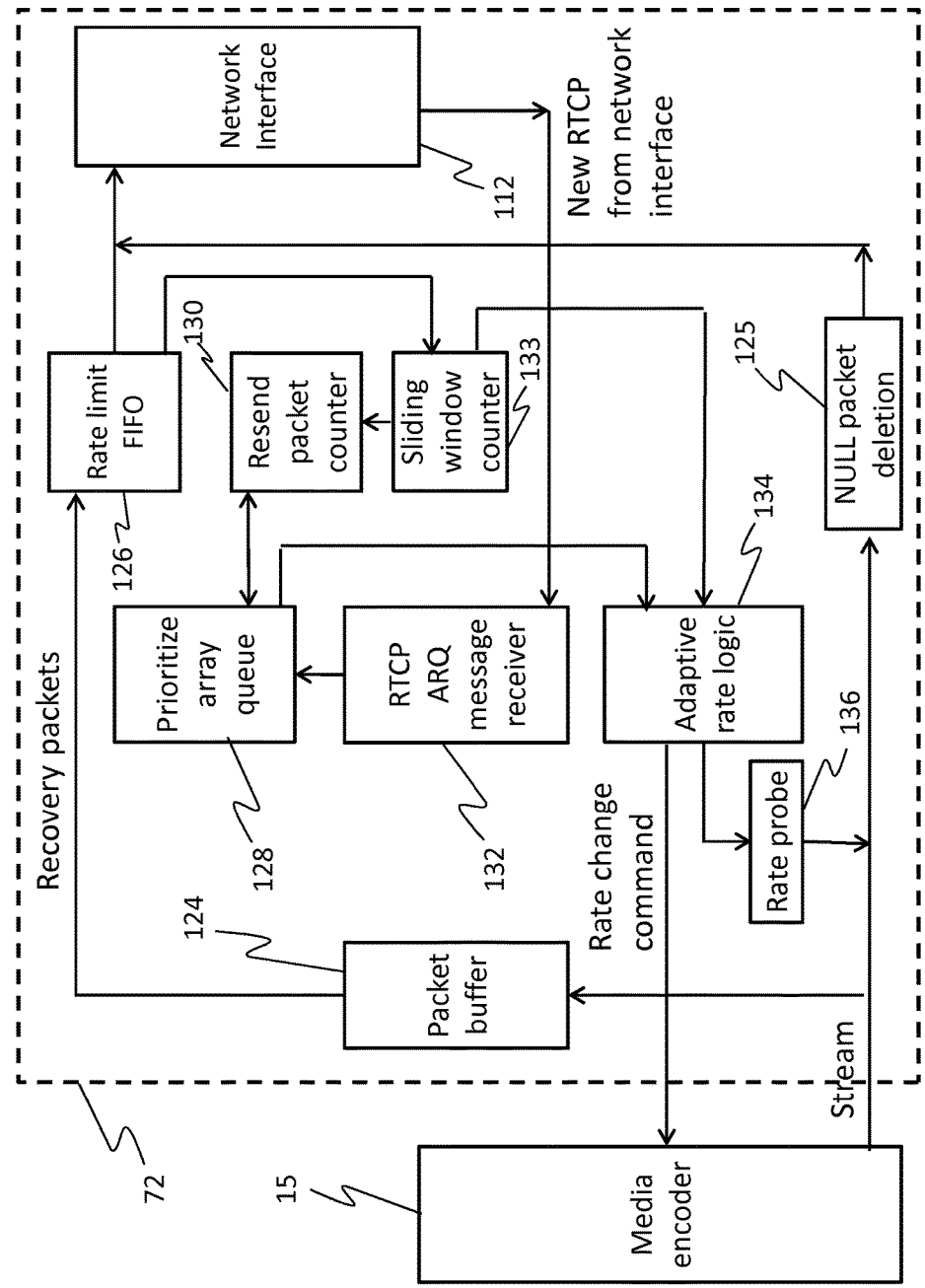

Reference is currently made to FIGS. 3 and 4, which are schematic process block diagrams of a media streaming system 70, including Media encoder 15 and IP network 25 of FIG. 1 and of an ARQ sender 72 and its interaction with the Media encoder, respectively, in accordance with an embodiment of the current invention. Apart from differences described below, Media encoder 15 and IP network 25 are identical in notation, configuration, and functionality to that shown in FIG. 1, and elements indicated by the same reference numerals and/or letters are generally identical in configuration, operation, and functionality as described hereinabove.

Media streaming system 70 functions with media encoder 15 sending media to an ARQ sender 72. The ARQ sender, through its Network interface 112, then streams its media output to IP network 25 and the media stream is received by an ARQ receiver 74 which then sends its output to a Media receiver 76. ARQ sender 72 includes the following process blocks: a Packet buffer 124, a NULL packet deletion process 125; a rate limit FIFO process 126; a prioritize array queue 128; a resend packet counter 130; a RTCP ARQ message receiver 132; a sliding window counter 133; an adaptive rate logic 134; and a rate probe 136—all of which are described further hereinbelow. Furthermore, ARQ sender 72 receives RTCP and outputs read recovery packets, bitrate selection, and video stream, as indicated in the figure.

Network interface 112 is assigned for each ARQ sender and the network interface includes a means to support unicast/multicast/VPN connection types: For VPN (Virtual Private Network), any type of VPN may be used, as long as it is capable of supporting UDP/RTP traffic, bi directional communication, stream encryption, and retransmission of packets. The VPN may also support unicast/multicast. Embodiments of the present invention are not limited to one type of VPN technology, as it may be adapted to VPNs like Generic routing encapsulation, IPSEC, OPENVPN, HTTP tunneling any many other similar solutions known in the art.

On the transmitting side the Network interface 112 serves to receive an IP media stream, RTCP communication/control, and auxiliary packets internally forwarded to it and to send them through a predefined protocol (unicast/multicast/VPN) to the receiver.

On the receiving side, the network interface serves to accept traffic from a unicast/multicast/VPN source and to convert standard IP packets. The packets are them forwarded to their designated blocks (RTCP, Auxiliary; NTP, DNS and similar services). In most SW/HW implementations a common memory space is reserved to hold incoming and outgoing traffic.

Packet buffer process block 124 stores media stream packets to allow recovery packet retransmission in case the packets are called by a request from ARQ receiver 74 (FIG. 3). Media stream packets are entered according to their RTP sequence number; so that any request having a sequence number or range can easily be fetched from the buffer. Each packet has a pre-defined time period and when the time expires the packet is released from the buffer.

NULL packet deletion process block 125 serves to assist in saving bandwidth. NULL packets are used by the MPEG 2 Transport to pad the stream to allow constant bit rate streaming. NULL packets are identified by a unique packet descriptor and carry fixed redundant data. The NULL packet deletion process marks the location of the NULL packet in an IP packet payload (not shown in the figure) and removes NULL packets to obtain bandwidth saving. The NULL packet deletion process block serves to attach a new RTP header with flags indicating the original location of the NULL packet for re-insertion back by the media receiver.

Media encoder 15 is external to ARQ sender 72. The encoder can change its video bit rate without restarting or halting encoding. An output stream from Media encoder 15 may have one of two configurations:
1. Constant rate—fixed stream rate with video rate that may change from time to time. The stream is padded with NULL Packets to achieve a fixed output rate.
2. Variable rate—the stream rate changes with the video. NO null packets are used for padding.

The encoder allows external commands to set the video bitrate to a new level from a variety of communication protocols; SSH/telnet/Snmp/XML/HTTP/REST/AJAX Rate limit FIFO 126 receives recovery packets and serves to report the number of bits waiting to be transmitted for further processing and its interaction with other processes within sender device 105 is discussed further hereinbelow.

Prioritize array queue 128 serves to store incoming ARQ packet requests in a prioritize data base (based on a request sequence number). Requests are rearranged in a novel data base that maintains a small array of requests representing a sequence of requests or a single request. A request may be of a fixed size or of a range of values. Each individual request is split into two entries; request START (RS) and request END (RE) with the request value being identical. A range request is split to request START range to request END. When entries are inserted into the data base, they are organized once within the data base to create sub ranges. Two consecutive entries are read from the database, and based on flags in the message the requested packet is pulled from the stream buffer for retransmission. The two entries may signal a single packet readout (in the case where the sequence value is the same) or a range of packets. The packet signals rate limit FIFO 126 for its readiness to enter the FIFO data base. The packet then waits to for acknowledgment to enter or a tackoff signal to wait further.

Sliding window counter 133 receives a data flow from rate limit FIFO 126 and serves to monitor how many bits pass from the rate limit FIFO. The sliding window counter serves to calculate and store the number of bits sent during a period of one second.

The sliding window counter uses so-called "ticks". Each tick can, for example, represent 10 ms, with each entry having a budget of bits that may be transmitted during that timeframe. A "window" can be defined, for example, as 100 ticks, namely 1 second. For each new tick, a predefined value is added and a value of actual transmitted bits is subtracted. As part of the monitoring function of how many bits pass from the rate limit FIFO, every time an old tick entry is cleared memory for a new entry is made available. The total value of the entries in the window in the description above is calculated for the total number of bits that passed during the last 100 ticks, i.e. last second.

It is noted that the value of a tick in embodiments of the current invention may be less or more than 10 ms, although tick values are typically significantly less than 1 second. Likewise, the value of 100 ticks to measure a total number of bits that have passed may be more or less; however a typical total time value of a plurality of ticks can range approximately from 0.5 to 2 seconds.

Data from Sliding window counter 133 gives an indication of the budget of how many recovery packets may be transmitted to the receiver during a given time, for example: one second.

Rate limit FIFO 126 serves to impose a first priority on the RTP media stream, with protection packets being constrained to a predefined pre-allocated bitrate. One aspect of embodiments of the current invention is to overcome a fundamental constraint of an ARQ system, which typically causes extra packet loss in case of protection bursts and/or following requests. Rate limit FIFO 126 serves to not exceed allowed bitrates and acts to smooth recovery packet flow while keeping a fixed total bitrate. Keeping a constant and predefine bitrate is crucial for applications making use of limited capacity links such as ADSL/VDSL or satellite data links.

The rate limit FIFO process takes use of data from sliding window counter 133 to allow IP packets to be transmitted on time every tick so that the transmitted number of bits does not exceed a predefined bandwidth allocation.

Rate limit FIFO 126 allows packets to be inserted to a data base if the data base is not full and to wait their turn for transmission, if the data base is full. If the data base is full, the rate limit FIFO process serves to issue a tackoff signal to halt transmitters from sending packets, until such time that the rate limit FIFO allows a new entry to be inserted.

Resend packet counter 130 serves to gather statistics from various process blocks to assess the protection potential (ref discussion of FIG. 5) status of the stream. Values gathered from Prioritize array queue 128, Rate limit FIFO 126, and the Sliding window counter processes serve to generate a value that is used by Adaptive rate logic 134 to decided which bitrate to select next, or to what Rate probe 136 action to take.

Stated schematically:

Protection Potential=(Stream buffer size+Sliding window)−(number of request in Priority queue+ Number of Packets in Rate FIFO)

RTCP ARQ message receiver 132 serves to manage the RTCP messaging system between sender and receiver units. The RTCP protocol is a part of the RTP protocol which carries control information between sender and receiver, and is associated with each stream. RTCP messages carry control and other information between the sender and the receiver in accordance with the RTCP standard. The RTCP client is also responsible for sending packet request information in a specific format that in includes a missing packet sequence number range; start range—end range. Several such requests may be sent with one RTCP packet back to the sender.

Upon receiving a new request message, RTCP ARQ message receiver 132 passes the information to Priority array queue 128 for further processing.

Adaptive rate logic 134 serves to monitor events and statistics coming from various process blocks and to decide on the next bitrate selection and the Rate probe action. Adaptive rate logic 134 has two major functions:

1. Monitor statistics information and the protection potential value to decide on bitrate decrease or increase;
2. Control Rate probe 136 process, while monitoring the impact of rate probe on the stream; and
3. Commanding the remote encoder via a communication protocol such us HTTP/REST/AJAX/SNMP/XML etc.

The Monitoring function of Adaptive rate logic 134 has two main tasks:

1. Monitor the protection potential to decrease the bitrate; and
2. Monitor if the protection potential is a higher than a predefined protection potential threshold value and then to attempt to increase the bitrate after a successful probe test.

The first task is simply monitor the protection potential value, compared to a threshold, if the threshold is passed, then the Protection potential of the system is low and may not guaranty proper protection in the near future. Then select a low bitrate for next selection point. This monitoring is essential to maintain protection capability for the media stream; a capacity drop translates to an increase of lost packets and increase of requests, the protection potential decreases in correlation to the increase of request in process by the ARQ block. The system must maintain enough buffering to allow the drop to a new, lower bit rate to overcome the capacity drop.

The second task is to attempt to probe the network to see if a higher bitrate step may be in use. This action will probe the network with a 'dummy' stream sent in parallel to the media stream, simulating an increase of bandwidth (e.g. higher bitrate). If the operation is successful and minimal impact is seen on the protection potential, then bitrate may be set for the next transition point.

Rate probe 136 serves to send a predefined stream of media packets to be added to the standard media stream to measure available bandwidth the media stream would experience if the rate had a higher bandwidth. Rate probe 136 accepts a command to start transmitting a 'step' of bit rate, the step defined as a percentage of the media stream, corresponding to a difference between the current stream bitrate and the next successive stream bitrate.

The stream in Rate Probe 136 uses 'dummy' packets to create the basis to the stream used for bandwidth evaluation. The stream is transmitted between the Sender and the receiver for a fixed duration on time. Dummy packets are selected so that they don't interfere with the original media stream. Upon completion of the transmission, the rate probe process block waits for the next command to perform a probe test.

Figure 5:
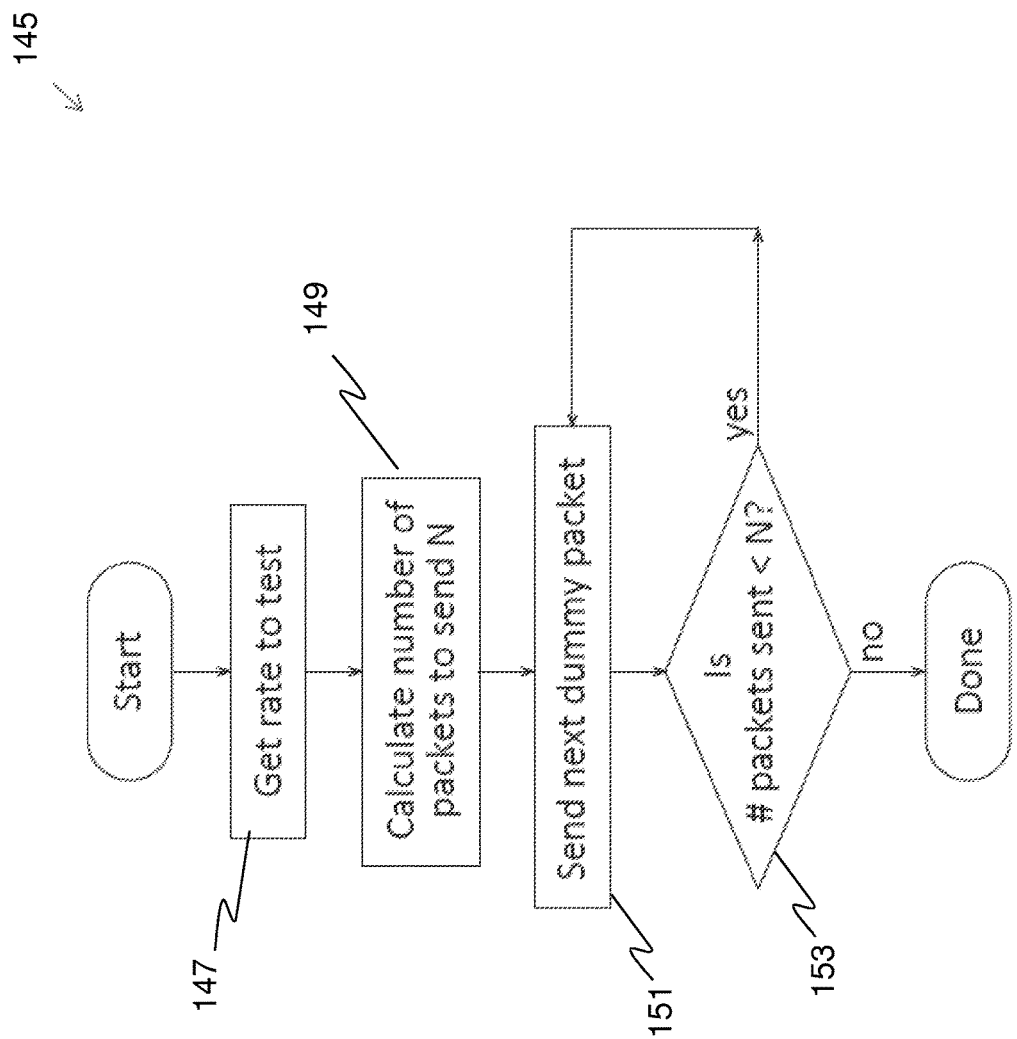
FIG. 5 is a flowchart indicating a rate probe decision flow, in accordance with an embodiment of the current invention.

Reference is currently made to FIG. 5, which is a flowchart indicating a rate probe decision flow 145, in accordance with an embodiment of the current invention. Rate probe decision flow 145 starts with Get rate to test 147 and continues with Calculate number of packets to send N 149. Then Send next dummy packet 151 is performed, followed by the test: Is number of packets sent<N?. If "yes" control is iterated back to send next dummy packet 151 and the number of packets is again compared with N. If "no", meaning the number of packets is equal to or greater than N, rate probe decision flow 145 is complete.

Figure 6:
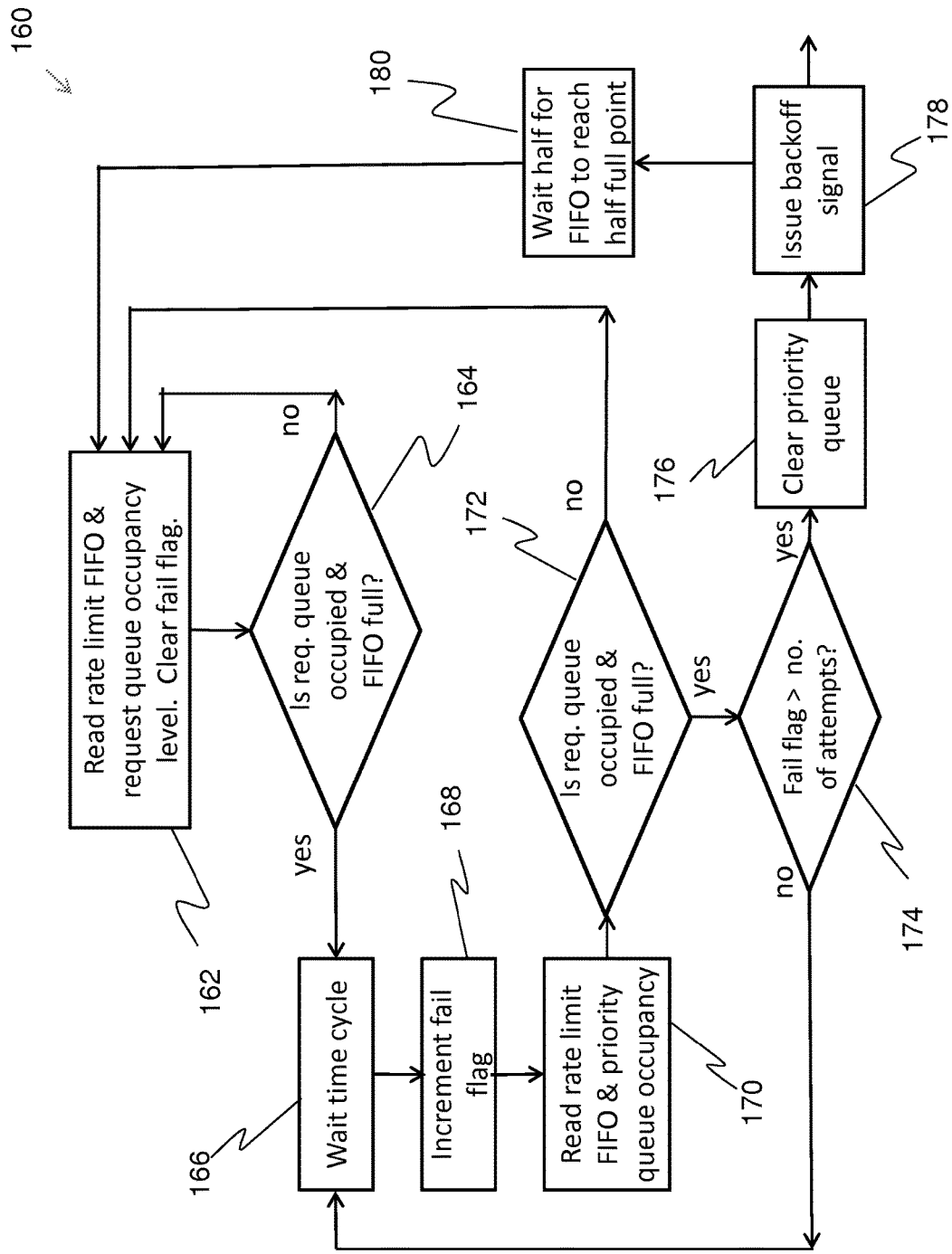
FIG. 6 is a process flowchart showing a backoff decision flow, in accordance with an embodiment of the current invention.

Reference is currently made to FIG. 6, which is a process flowchart showing a backoff decision flow 160, in accordance with an embodiment of the current invention. The backoff decision flow process is performed upon receipt of a new error request (not shown in the figure). Read rate limit FIFO & request queue occupancy level 162 serves to read rate limit FIFO and the request queue occupancy level and clears the fail flag. A first decision is Is request queue occupied (i.e. full) and FIFO full? 164. If yes, control is transferred to Wait time cycle 166. If no, control is reverted back to Read rate limit FIFO & request queue occupancy level 162. After Wait time cycle 166 the fail flag is incremented in Increment fail flag 168, followed by Read rate limit FIFO and priority queue occupancy 170. Another decision is Is request queue occupied (i.e. full) and FIFO full? 172. If no, control is reverted back to Read rate limit FIFO & request queue occupancy level 162. If yes, another check is performed in Fail flag greater than number of attempts? 174. If no, control is reverted to Wait time cycle 166. If yes—meaning there currently is no "room" for additional recovery requests—then the priority queue is cleared in Clear priority queue 176, then Issue backoff signal 178, and Wait half for FIFO to reach the half full point 180, then control is reverted to Read rate limit FIFO & request queue occupancy level 162.

Figure 7:
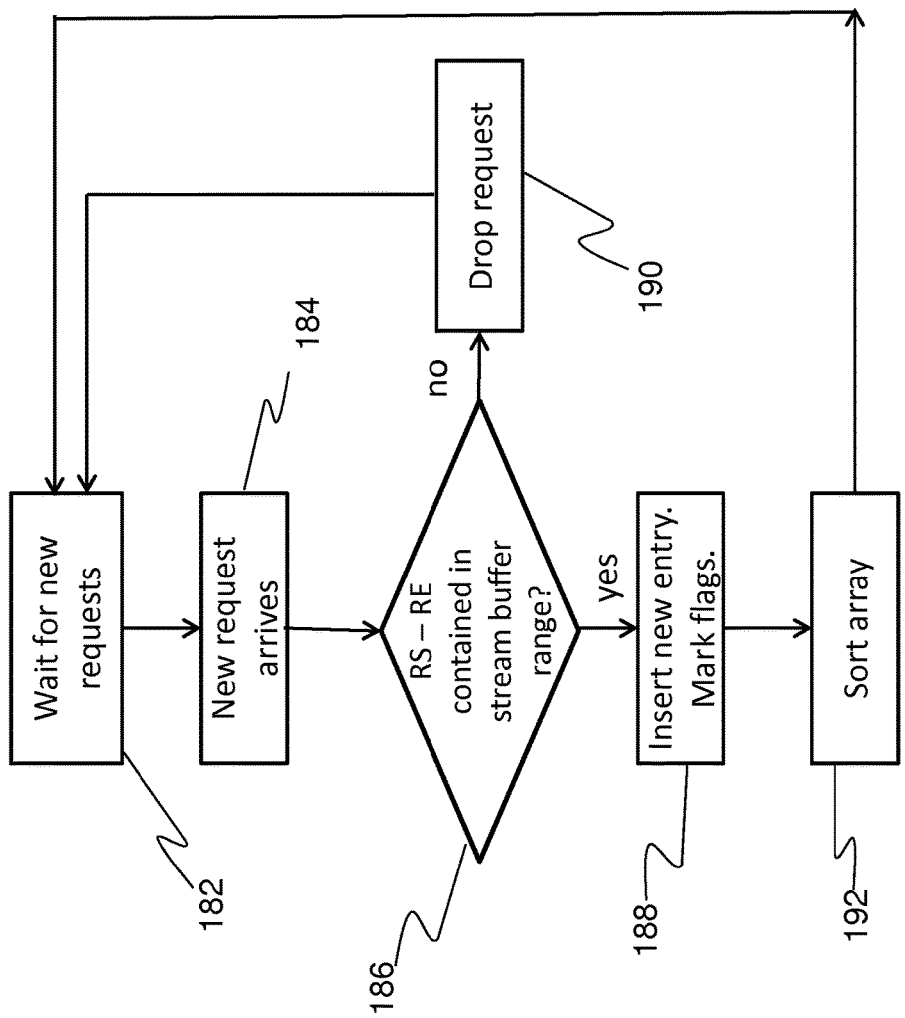
FIG. 7 is a flowchart of an array mapping algorithm, in accordance with an embodiment of the current invention.

Reference is currently made to FIG. 7, which is a flowchart of an array mapping algorithm 180, in accordance with an embodiment of the current invention. Array mapping algorithm starts with Wait for new request 182, followed by New request arrives 184. As described hereinabove (ref discussion of FIG. 8) a request is split into two entries; request START (RS) and request END (RE). In RS-RE contained in stream buffer range? 186, the two entries are compared. If no, then Drop request 190 and control is reverted to Wait for new request 182. If yes, Insert new entry and Mark Flags 188 and proceed to Sort array 192. Then control is reverted to Wait for new request 182.

In array mapping algorithm 180, if all of the entries in a range have been sent, pop the two entries and continue to read the next two. If there is a failure in the middle (i.e. failed to send a request to the rate limit block) update the entry to the last index and mark as 'start' flag and wait for approval to send again.

Figure 8:
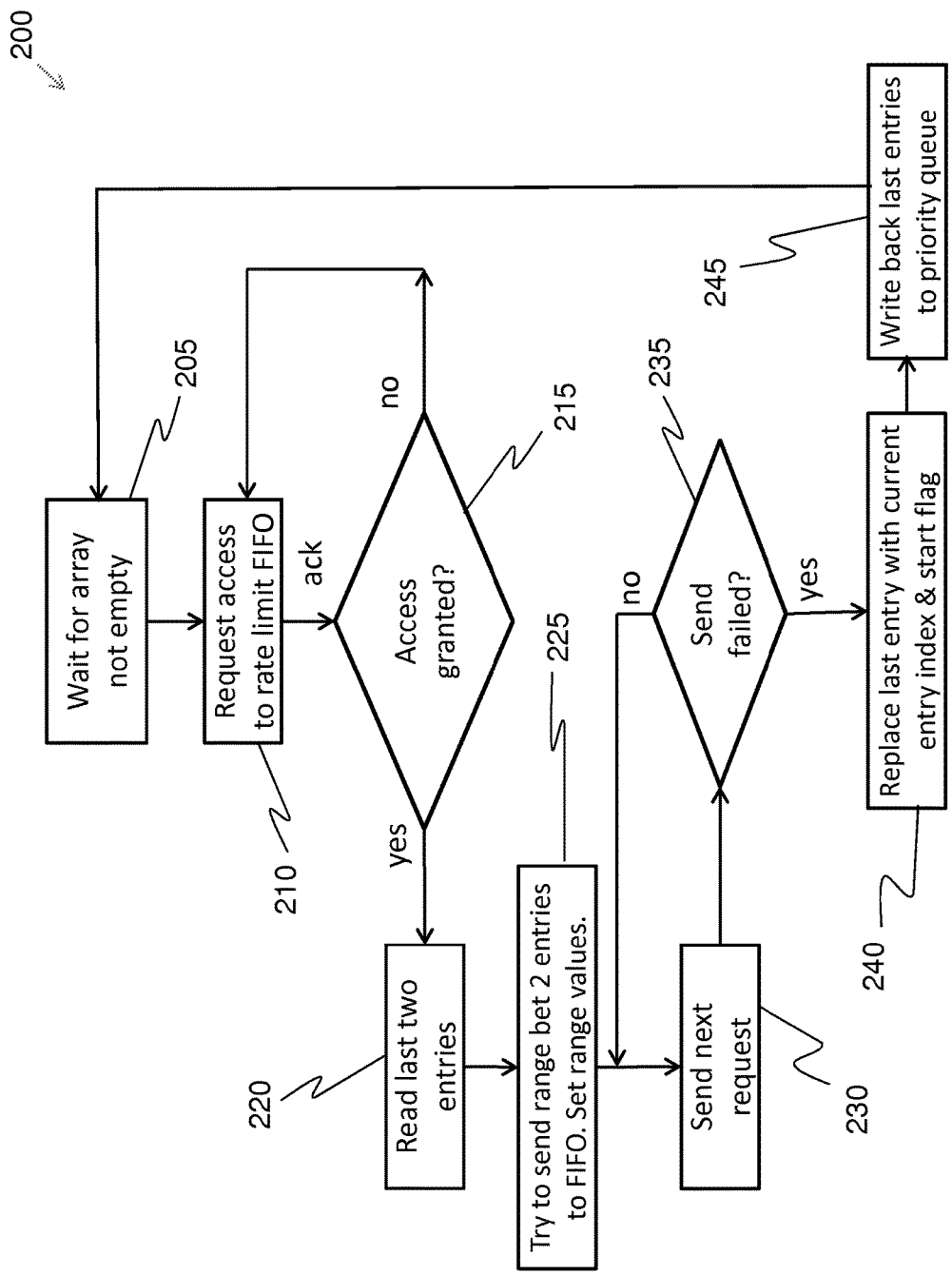
FIG. 8, is a flowchart indicating a process of reading request entries, in accordance with an embodiment of the current invention.

Reference is currently made to FIG. 8, which is a flowchart indicating a process of reading request entries 200, in accordance with an embodiment of the current invention. Process of reading request entries 200 begins with Wait for array not empty 205. As long as the array is not empty, control is transferred to step 210, Request access to rate limit FIFO. The request is acknowledged and a decision Access Granted? 215 is made. If yes, Read the last two entries 220. If no, control reverts to step 210, Request access to rate limit FIFO. After Read the last two entries 220, control is transferred to step 225 Try to send range between two entries to FIFO. Set range values. The next request, step 230 Send next request, is performed. Decision Send failed? 235 yields either no, whereupon control is reverted to step 230 Send next request, or yes, step 240 Replace last entry with current entry index and start flag. Step 245 Write back last entries to priority queue follows. Then control reverts to Wait for array not empty 205.

Figure 9:
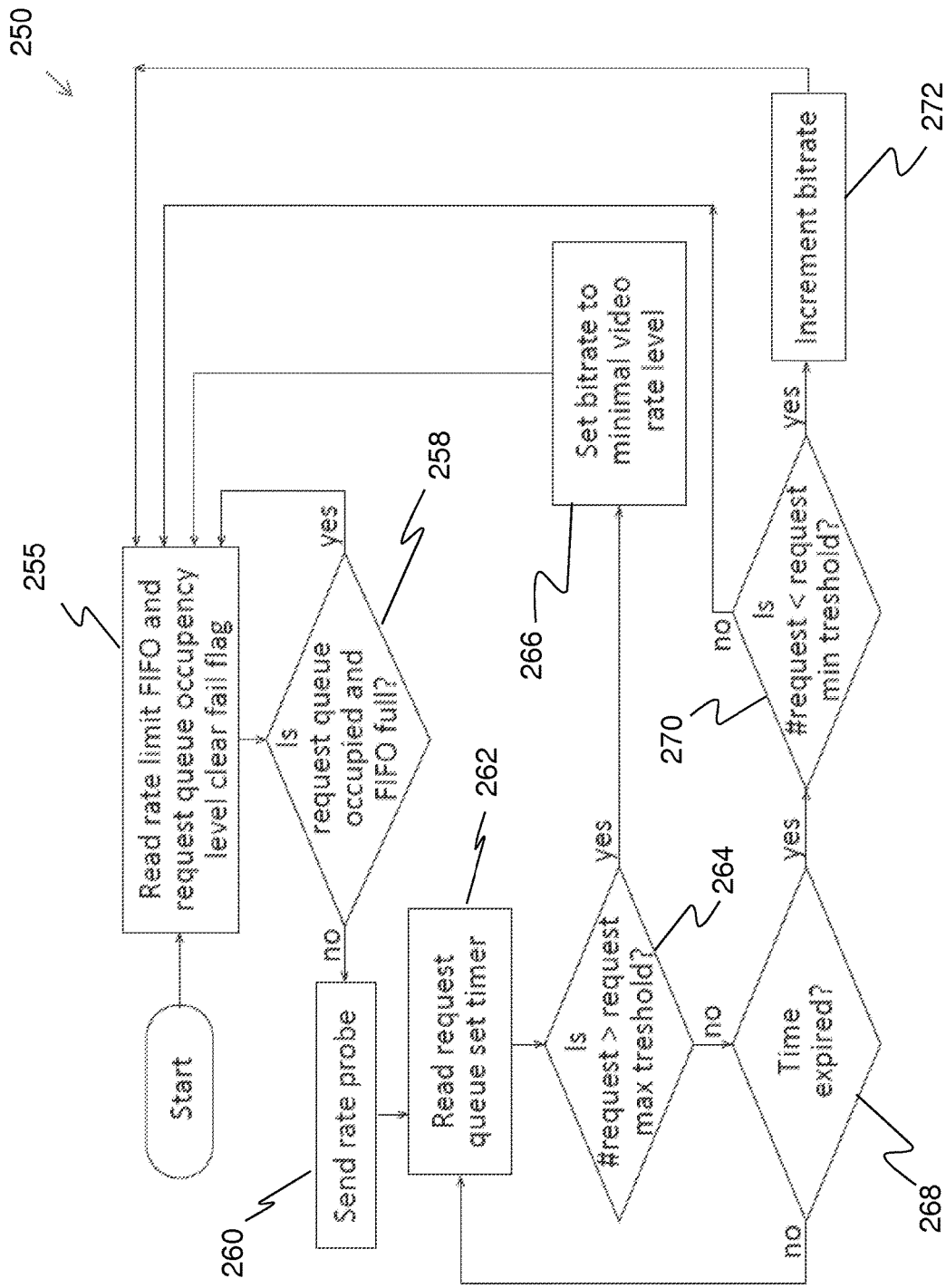
FIG. 9 is a flowchart showing a controlled adaptive rate decision process to adjust bitrate, in accordance with an embodiment of the current invention.

Reference is currently made to FIG. 9, which is a flowchart showing a controlled adaptive rate decision process 250 to adjust bitrate, in accordance with an embodiment of the current invention.

Controlled adaptive rate decision process 250 includes a process for evaluating the action of a bitrate probe (ref FIGS. 4 and 5). If the action creates a number of requests (each request representing a lost packet) larger than a predefined maximum threshold value, the current bit rate may be too high for current network conditions and a lower bandwidth bitrate is advisable. If the action creates low amount of requests, i.e. lower than a predefined minimum threshold value, network conditions can most probably tolerate a higher bandwidth bitrate.

The overall data/process flow involves:
Read the rate limit FIFO and request queue occupancy levels to calculate the protection potential);
If the occupancy of either the request Queue or the Rate limit FIFO is full—start over, else;
Monitor the request queue over a predefined period of time. If during this time period the number of requests is higher that a predefined maximum request threshold; reduce current bitrate by and start over;
Else, if the number of requests during the time period is below a minimum request threshold; increase the bitrate; and
Start over the process.

A full description of all the process steps of adaptive rate decision process 250 follows.

Read rate limit FIFO & request queue occupancy level 255 serves to read rate limit FIFO and the request queue occupancy level and clears the fail flag. A first decision is Is request queue occupied (i.e. full) and FIFO full? 258. If yes, control is transferred back to step 255 Read rate limit FIFO & request queue occupancy level. If no, a rate probe is sent in step 260 Send rate probe. Then step 262 Read request queue, set timer is performed. The question Is no. request>request maximum threshold? 264 is asked. If yes, the bitrate is reduced in step 266 Set bitrate to minimum video rate level and control is returned to Read rate limit FIFO & request queue occupancy level 255. If no, step 268 Time expired? checks total allocated time. If yes, the question Is no. request<request minimum threshold? 270 is asked. If no, control is reverted to step 262 Read request queue set timer.

If Is no. request<request minimum threshold? 270 is yes, then step 272 Increment bitrate and revert control to step 255 Read rate limit FIFO & request queue occupancy level. If no, revert control to step 255 Read rate limit FIFO & request queue occupancy (without incrementing bitrate).

Figure 10:
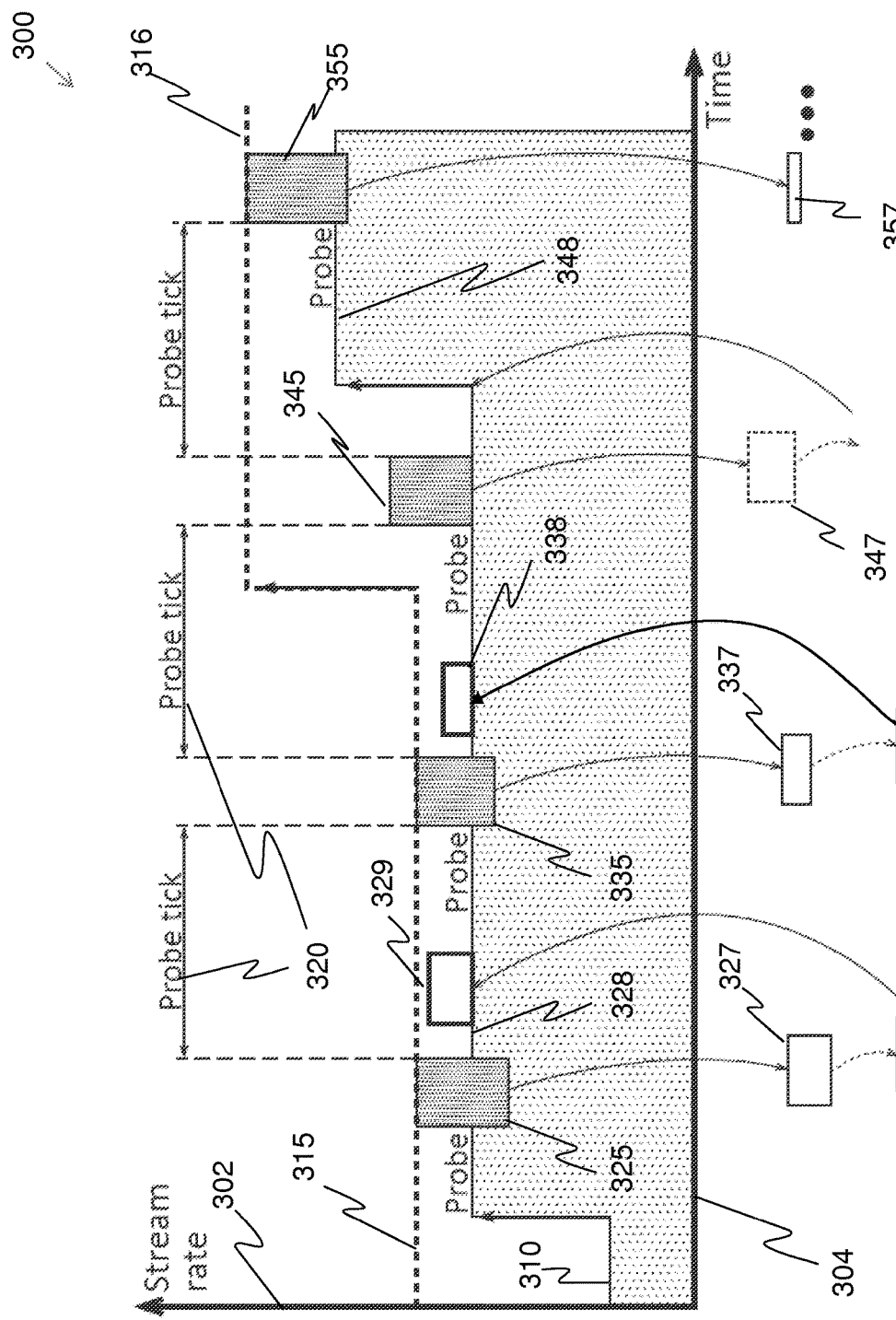
FIG. 10 is a stream rate versus time schematic diagram showing a stream rate axis and a time axis, an initial media stream, network bandwidth capacities, probes tests, and resultant bitrate media stream adjustments (i.e. "stream rates"), in accordance with an embodiment of the current invention.

Reference is currently made to FIG. 10, which is a stream rate versus time schematic diagram 300 showing a stream rate axis 302 and a time axis 304, an initial media stream 310, network bandwidth capacities 315 and 316, probes tests 325, 335, 345, and 355, and resultant bitrate media stream adjustments (i.e. "stream rates") 328 and 348, in accordance with an embodiment of the current invention. An Initial media stream 310 starts with a bitrate stream rate adjustment 328. As stream rate 328 is below network bandwidth capacity 315, the Adaptive rate logic process 134 (identified in FIG. 4) initiates a rate probe 325, which causes a packet loss 327 and a request 329 to send the packet loss back to the sender. (Packet requests are responded with ARQ retransmission packets). As rate probe 325 created lost events, the Controlled adaptive rate process waits a probe tick 320 to perform another probe test 335. There is another packet loss 337 and another request 338 to send it back to the sender. After another tick, network capacity 316 increases, and a probe test 345 is successful with no packet loss 347. The successful probe test causes Controlled adaptive rate process to select a new higher bitrate 348. Finally, after another probe tick, another probe test 355 is performed and another packet loss 357 occurs, and so on.

Because exemplary Network capacities 315 and 316 are representative of periodical probing, the expression "instantaneous network bandwidth" is used hereinbelow in the specification and in the claims to have the same meaning as "Network capacity" described hereinabove.

Figure 11:
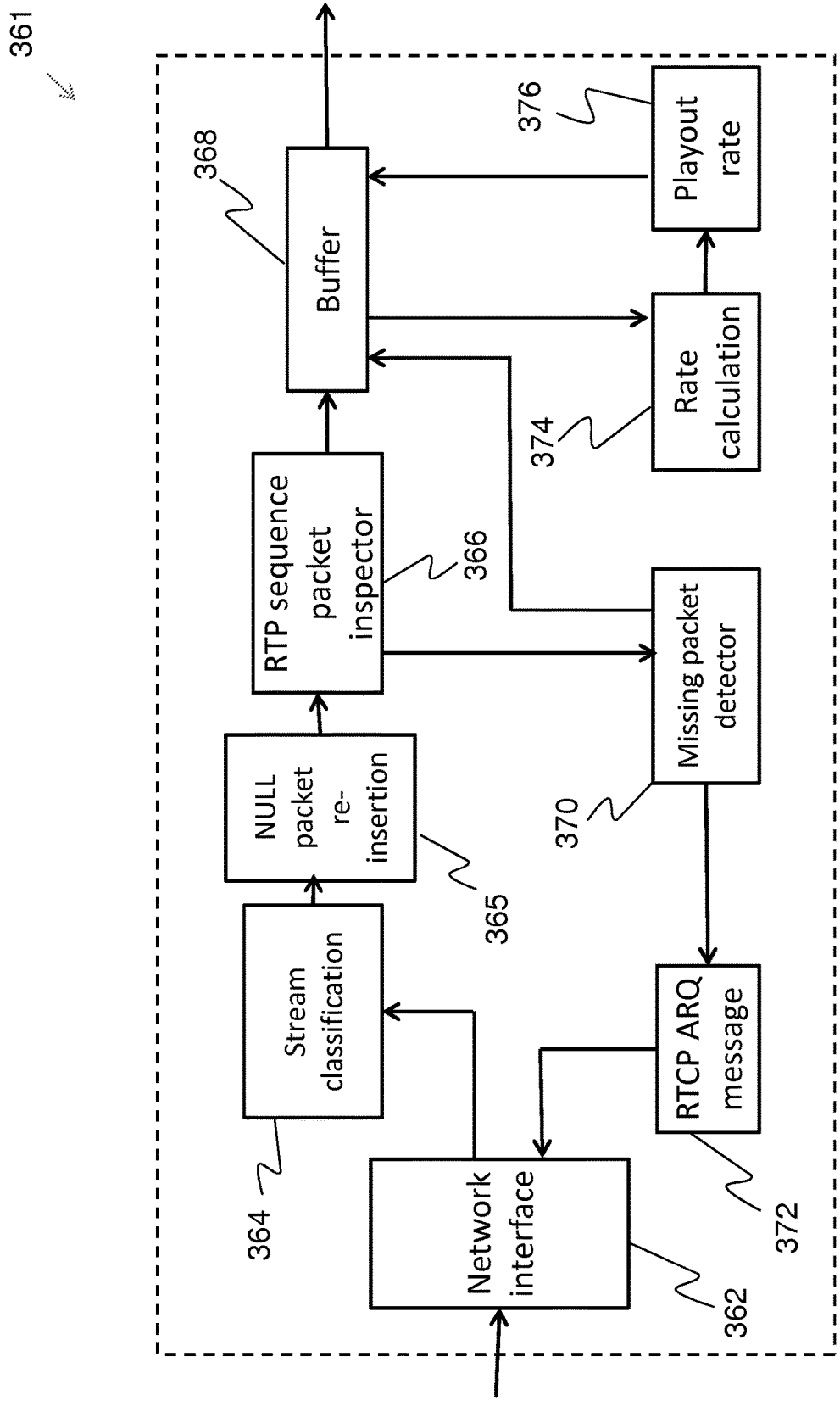
FIG. 11 is a schematic process block diagram of a receiver device (also called "ARQ receiver"), in accordance with an embodiment of the current invention.

Reference is currently made to FIG. 11, which is a schematic process block diagram of a receiver device 361 (also called "ARQ receiver"), in accordance with an embodiment of the current invention. Receiver device 361 works with ARQ sender 72 to receive media packets and recover lost packets, if such event occurs. In the case of packet disorder, the ARQ receiver uses an RTP sequence number to reorder packets to their original order, so that any packet disorder or late arrival due to retransmission is handled by the sequence number index to the data base. ARQ receiver 361 monitors the primary media stream and 'dummy' packets associated with the 'network probe' function (ref FIGS. 4, 9, and 10 inter alia). The ARQ receiver reports any loss event for a 'dummy' packet only once, while media packets are reported several times (according to a configuration of how may request to send per each loss event). A media stream enters the receiver device and Network interface 362, as shown in the figure, and another media stream exits the receiver device as shown, going to a video/audio decoder—not shown in the current figure.

A Network interface 362 is associated with each ARQ receiver. The network interface includes the means to support unicast/multicast/VPN connection types. For the VPN capability, any type of VPN may be used, as long as it is capable of supporting UDP/RTP traffic, bi directional communication and stream encryption. The VPN may also support unicast/multicast. Embodiments of the current invention are not limited to one type of VPN technology, as they may be adapted to VPNs such as Generic routing encapsulation, IPSEC, OPENVPN, and HTTP tunneling any many other similar solutions.

On the receiving side, Network interface 362 serves to accept traffic from a unicast/multicast/VPN source and to convert standard IP packets. Packets are then forwarded to their designated processes (i.e. to stream classification, RTCP and auxiliary; NTP, DNS and similar services).

On the transmitting side the Network interface receives an IP media stream, RTCP communication/control, and auxiliary packets internally forwarded to it and sent to it through a predefined protocol (unicast/multicast/VPN) to the destination.

In most software/hardware implementations a common memory space is reserved to hold incoming and outgoing traffic in the Network interface.

A Stream classification process 364 blocks any unwanted traffic and allows and redirects incoming packet for further processing. The stream classification process may be achieved in many ways: hash data base; allowed lis; inter alia. Stream classification process 364 accepts a pointer representing a link to the actual IP packet in memory. The pointer includes basic IP header parameters and an RTP header. Each IP packet pointer is inspected for its IPv4/IPv6 parameters and UDP source/destination port and redirection information is applied.

TS NULL packet re-insertion process block 365 serves to undo packet deletion by NULL packet deletion process block 125 of FIG. 4. TS NULL packet re-insertion process block 365 reads the RTP header information to detect if NULL packets where present in the original payload and determines where to r insert the NULL packets. The TS NULL packet re-insertion process block builds a new payload for the packet by copying original packets and NULL packets back to their original order.

An RTP sequence packet inspector 366 monitors the progress of incoming RTP media packets pointers prior to their temporary storage in the pointer buffer. Each pointer RTP sequence number is extracted for inspection. A new pointer is inspected in the following steps:
1. If the new sequence number is out of range of the buffer head and tail range, then drop the pointer and free its associated memory for that media packet;
2. If the new sequence number is smaller than the previous sequence number then go to step 5 below;
3. If the new sequence number is higher by 1 or more from the previous sequence number, push the packet into the buffer, update the previous sequence number to be the new sequence number and set flag 'missing packet detected';
4. If 'missing packet detected' is set, send the sequence number notification to the missing packet detector process block;
5. Test for wrap around. If wrap around is found set a wrap_around flag and go to step 3 above. Else drop the packet and free its associated memory for that media packet; and
6. Clear temp flags and go to wait for new pointer.

A buffer process block 368 holds a sequential array of pointers based on 16 bits of the RTP sequence number, with each pointer entered according to the RTP packet sequence number. The buffer process maintains a head pointer signaling the last entry to buffer and a tail pointer the next pointer to read from the buffer (for POP operation). The difference between head and tail is the amount of packets in the buffer.

A missing packet detector 370 monitors and generates ARQ requests for missing packets. Each new 'missing packet detected' event is logged and assigned a test duration timer. The number of test periods is predefined and should not exceed the buffer delay. Each time a missing packet duration timer expires, a buffer inspection logic is invoked to examine if the packet did not arrive, as follows:
1. If the packet request is missing, issue a new one and a new timer is set;
2. Else, the operation stops.

For each new 'missing packet detected' event, the process also checks the sequence number neighbors to determine if they may also be missing, and then may generate a range of 'requests' for further processing. Each request is then assigned with a timer.

The buffer inspection is invoked for these two events:
1. New 'missing packet detected' notification from the RTP sequence number inspector process block; and
2. One of the times of the timers expires.

For each packet request or range or request a message is sent to the RTCP ARQ message block for processing.

An RTCP ARQ message process 372 manages the RTCP messaging system between sender and receiver units. RTCP protocol is a part of the RTP protocol to carry control information between sender and receiver, and it is associated with each stream. RTCP messages carry control and other information between sender and the receiver in accordance to the RTCP standard, as known in the art. The RTCP client sends packet request information in a specific format that includes the stream, the missing packet sequence number range, and start range—end range. Several such requests may be sent with one RTCP packet back to the sender. Upon receiving a new request message from Missing packet detector 370, RTCP ARQ message process 372 generates an RTCP message which includes the request and any other requests pending. The message is transmitted to sender RTCP process block through network interface 362 to media server 382 for processing.

A Rate calculation process 374 keeps track of the number of packet pointers entering and departing the buffer, and calculates the bitrate based on timing information in the RTP packet or media internal timing information (such as PCR, if available in the media stream) or the average arrival of packets. The Rate calculation is then used by a Playout rate process 376 to read packets out to the destination receiver/player. The Playout rate process reads packets from the buffer and frees associated memory back to the SW/HW memory pool. Playout rate process 376 assures a fixed delay and constant packet readout to feed the receiver. Any packet that was has a null packet removal operation conducted on it is reconstructed back to its original state. The null packet is reinserted back to its original location within the IP packet.

The processes and/or process blocks described hereinabove are to be understood as generally residing on non-transitory computer-readable storage media having executable computer modules. The word "computer" used hereinabove and in the claims which follow is intended to mean any computing device, such as, but not limited to: a CPU; a personal computer; a server; and a mobile device, inter alia.

It will be appreciated that the above descriptions are intended only to serve as examples, and that many other embodiments are possible within the scope of the present invention as defined in the appended claims.

The invention claimed is:

1. A computer-implemented method for adaptive video bitrate switching of an MPEG-2 Transport Stream (TS) having a fixed stream rate and having video content, over an IP network, the method comprising the steps of:
   using a media encoder to encode a media stream having video content, the media stream sent as the -TS over RTP and by an Automatic Repeat-reQuest (ARQ) sending device to the network, the sending device employing User Datagram Protocol (UDP);
   receiving the TS from the network by an ARQ receiving device, the network having an instantaneous network bandwidth for the TS, and the receiving device transmitting a request for at least one recovery packet, the at least one recovery packet being part of a recovery packet stream, back to the sending device through the network upon at least one lost packet occurrence;

configuring the sending device to send the recovery packet stream to the receiving device in response to the request for at least one recovery packet;

giving priority to the media stream over the recovery packet stream by limiting the recovery packet stream sent by the sending device, the media stream having an initial media stream bandwidth;

using a probe having dummy packets to probe the instantaneous network bandwidth periodically to determine a resultant encoder media stream bandwidth which yields no lost packet occurrence; and operating the encoder to change its video bit rate without restarting or halting encoding to adjust the initial media stream bandwidth relative to the instantaneous network bandwidth for the sending device to use for sending the media stream.

2. The method of claim 1, whereby limiting the recovery packet stream sent by the sending device is performed according to a decision process that calculates a budget of recovery packets to be transmitted during a time period for the media stream, the process serving to limit a rate of error recovery requests in the instantaneous network bandwidth.

3. The method of claim 2, whereby a backoff decision process is performed upon receipt of a new error request, the backoff decision process further including evaluation of an error request queue, the queue having at least one error request, regarding a number of error requests in the queue over time.

4. The method of claim 3, whereby a protection potential is calculated and monitored to determine the resultant encoder media stream bandwidth.

5. The method of claim 4, whereby the media encoder interacts with the sending device, the sending device having an adaptive rate process module, which serves to perform a rate probe of the instantaneous network bandwidth and to determine the resultant encoder media stream bandwidth.

6. The method of claim 5, whereby network bandwidth probing is controlled by a rate probe process calculating a number of dummy packets sent in the media stream.

7. The method of claim 5, whereby the resultant encoder media stream bitrate has a value higher than the initial media stream bitrate when there is no lost packet occurrence.

8. The method of claim 7, whereby the resultant encoder media stream bandwidth has a value lower than the initial media stream bandwidth when there is lost packet occurrence.

9. A system for adaptively switching video bitrate in an MPEG-2 Transport Stream (TS) having a fixed stream rate and having video content, over an IP network, the system comprising devices and non-transitory computer-readable storage media having executable computer modules, comprising:

a media encoder configured to encode a media stream, having video content, as the TS over RTP and an Automatic Repeat-reQuest (ARQ) sending device configured to send the media stream to the network and the sender device configured to use User Datagram Protocol (UDP);

an ARQ receiving device configured to receive the media stream from the network, the network having an instantaneous network bandwidth for the media stream, and the receiving device further configured to transmit a request for at least one recovery packet, the at least one recovery packet being part of a recovery packet stream, back to the sending device through the network upon at least one lost packet occurrence;

the sending device further configured to send the recovery packet stream in response to the request for at least one recovery packet and to give priority to the media stream over the packet recovery stream by limiting the recovery packet stream sent from the sending device, the media stream having an initial media stream bandwidth;

a rate probe having dummy packets which are configured to be used periodically to probe the an instantaneous network bandwidth to determine a resultant encoder media stream bandwidth which yields no lost packet occurrence; and the encoder further configured to change its video bit rate without restarting or halting encoding to adjust the initial media stream bandwidth relative to the instantaneous network bandwidth for the sending device to use for sending the media stream.

10. The system of claim 9, wherein a decision process module is configured to limit the recovery packet stream sent by the sending device in the instantaneous network bandwidth by a calculation of a budget of recovery packets to be transmitted during a time period for the media stream, the process further configured to limit a rate error recovery requests in the instantaneous network bandwidth.

11. The system of claim 10, wherein a backoff decision process module is configured to be operative upon receipt of a new error request, the backoff decision process module further configured to evaluate an error request queue, the queue having at least one error request, regarding a number of error requests in the queue over time.

12. The system of claim 11, wherein a protection potential is configured to be calculated and monitored to determine the resultant encoder media stream bandwidth.

13. The system of claim 12, wherein the media encoder interacts with the sending device, the sending device having an adaptive rate process module, which serves to perform a rate probe of the instantaneous network bandwidth and to determine the resultant encoder media stream bandwidth.

14. The system of claim 13, wherein the rate probe is further configured to be controlled by a rate probe process module configured to calculate a number of dummy packets sent in the media stream.

15. The system of claim 14, wherein the resultant encoder media stream bandwidth has a value higher than the initial media stream bitrate when there is no lost packet occurrence.

16. The system of claim 15, wherein the resultant encoder media stream bandwidth has a value lower than the initial media stream bandwidth when there is lost packet occurrence.

* * * * *